April 29, 1924.
F. L. OVERTON
1,491,967
HOG RINGING CRATE
Filed Oct. 9, 1923
2 Sheets-Sheet 1
FIG. 1.
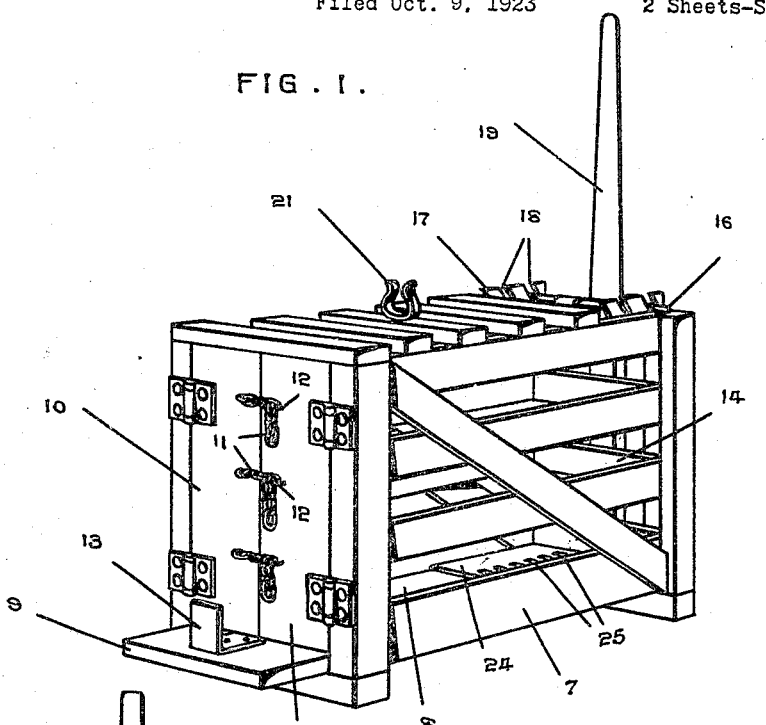
FIG. 3.
FIG. 2.
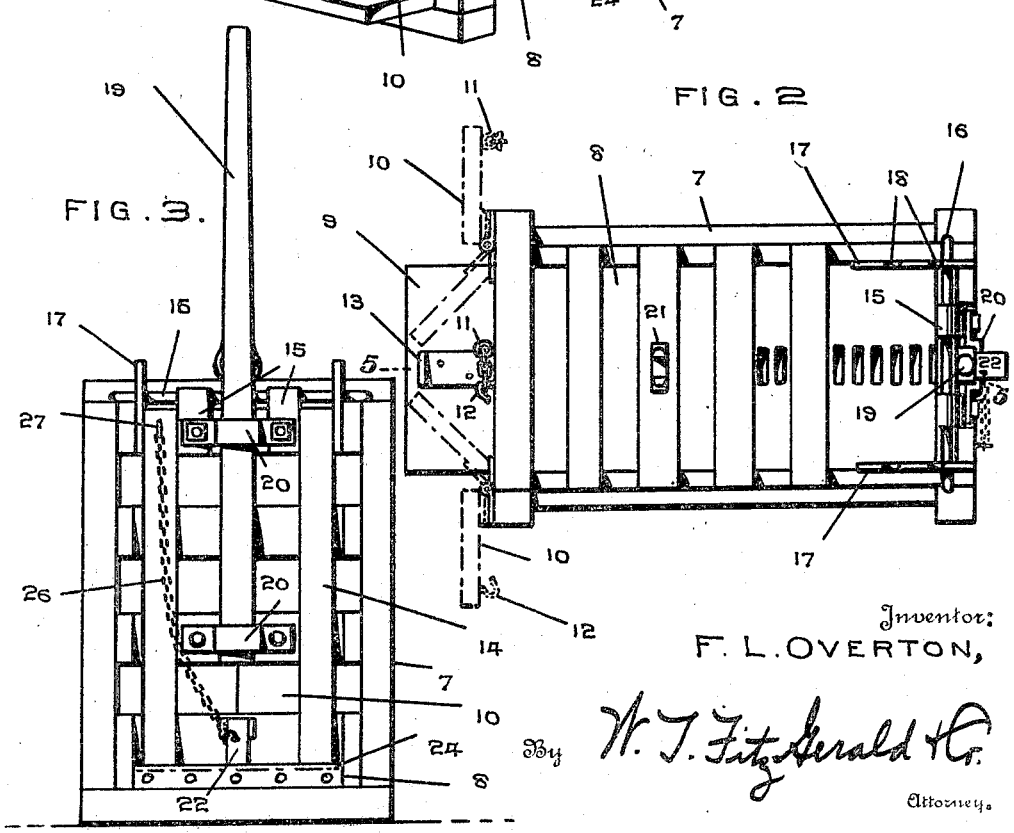
Inventor:
F. L. OVERTON,
By W. T. FitzGerald
Attorney.

April 29, 1924.  
F. L. OVERTON  
HOG RINGING CRATE  
Filed Oct. 9, 1923  
1,491,967  
2 Sheets-Sheet 2

Inventor:  
F. L. OVERTON,  
By W. J. FitzGerald & Co.  
Attorney.

Patented Apr. 29, 1924.

1,491,967

UNITED STATES PATENT OFFICE.

FRANK L. OVERTON, OF ODON, INDIANA.

HOG-RINGING CRATE.

Application filed October 9, 1923. Serial No. 667,531.

*To all whom it may concern:*

Be it known that I, FRANK L. OVERTON, a citizen of the United States, residing at Odon, in the county of Daviess and State of Indiana, have invented certain new and useful Improvements in Hog-Ringing Crates; and I do hereby declare the following to be a full, clear, and exact description of the invention, such as will enable others skilled in the art to which it appertains to make and use the same.

The present invention relates to an appliance for holding a hog to facilitate the application of a nose ring, and it is an object of the invention to provide a novel and improved device of that kind which is simple in construction and operation, and which is practical, convenient and efficient in use.

Another object of the invention is the provision of a crate or cell for holding the animal and provided with means at its forward end to accommodate the nose of the animal during the ringing operation, said crate or cell being provided with means at the rear end for trapping the animal and for holding it constrained within the crate or cell during the ringing operation, so that the operation can be performed quickly and conveniently.

It is also an object of the invention to provide such a contrivance which comprises a novel construction and assemblage of the component elements, to enhance the utility and efficiency of the device.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein—

Figure 1 is a perspective view of the crate with the front doors closed and the rear end member in closed position.

Fig. 2 is a plan view of the crate with the parts as shown in Fig. 1, and showing the front doors swung open in broken lines.

Fig. 3 is an enlarged rear view of the device with the parts as seen in Fig. 1.

The body 7 of the crate is of slatted construction, and has its front and rear ends open, and such body is constructed sufficiently strong to withstand rough handling. The bottom 8 of the body is extended, as at 9, beyond the forward end of the body to provide a shelf over which the nose of the animal is held during the ringing operation.

Figure 4:
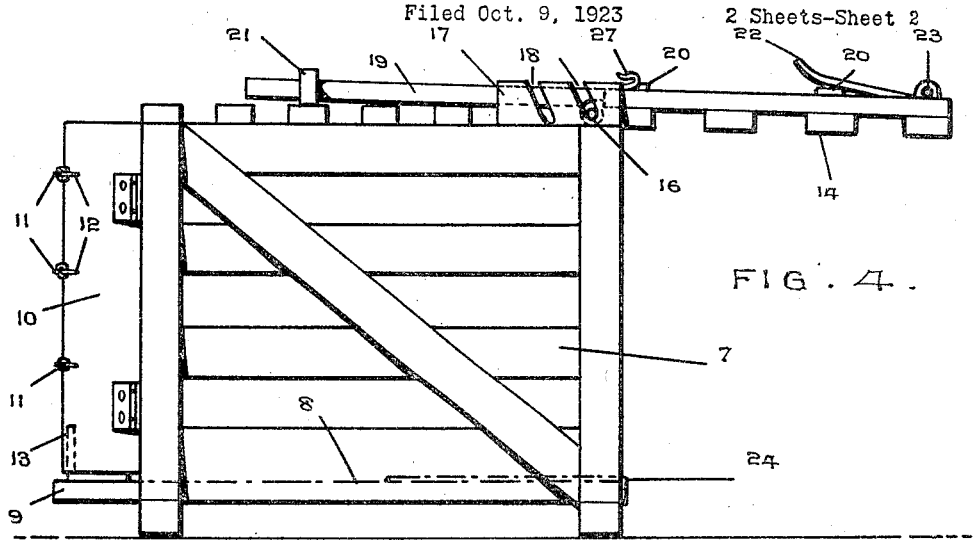
Fig. 4 is a side elevation of the device with the front doors and rear end member in position for the entrance of the animal into the crate.

The body has a double door at its forward end, comprising the doors 10 hinged at opposite edges to the forward end of the body, so as to swing open forwardly. In order to limit the separation or opening movement of said doors, chains 11 are anchored to one door 10 and the links thereof are engageable with hooks 12 or other keepers carried by the other door. The chains 11 can be engaged with the hooks 12, as seen in Fig. 1, to hold the doors 10 closed, or, when the doors 10 are opened slightly, as seen in Figs. 4 and 5 and in broken lines in Fig. 2, the chains 11 can be engaged with the hooks 12 so as to limit the separation or opening movement of the doors, with a gap or opening of desired width between the edges of the doors through which the nose of the animal can extend forwardly.

Figure 5:
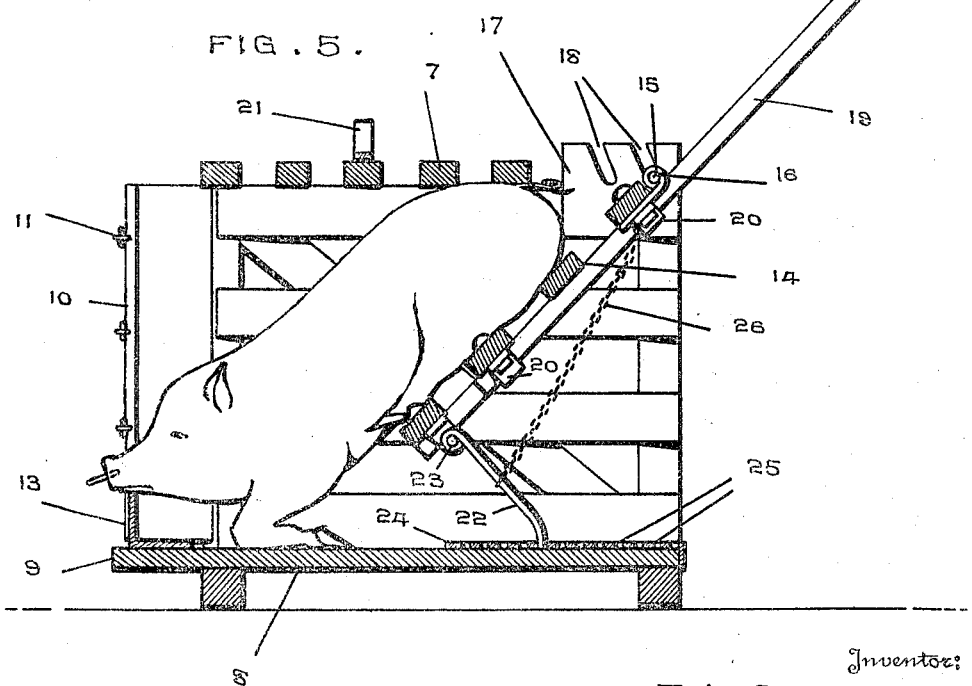
Fig. 5 is an enlarged longitudinal vertical section on the line 5—5 of Fig. 2 showing the parts in position for holding the hog during the ringing operation.

A head rest 13 is secured on the shelf or extension 9 of the bottom 8 to be disposed at the lower end of the slot or opening between the doors, when they are opened slightly, so that the head of the animal which extends out through the opening can rest on said head rest 13, as seen in Fig. 5. The nose of the animal is thus supported above the bottom or floor 8 for convenience in performing the ringing operation.

A rear end member 14 is provided and same is of a size to swing into the body 7. The end member 14 is suspended for swinging movement. Thus, bearings 15 are secured to the upper end of the member 14 and engage a transverse hinge rod 16, and plates 17 are secured to the sides of the body at the rear upper corners thereof and have longitudinally spaced slots 18 for receiving said rod. The member 14 can be adjusted to different longitudinal positions by placing the rod 16 in different slots 18, and the rear end member can thus be adjusted for animals of different lengths and sizes, and the end member is suspended for swinging movement about the transverse axis of the rod 16.

A handle 19 is provided for said rear end member, and projects above the upper end of said member, the handle 19 being fitted in sockets 20 secured to the member 14.

The handle 19 is also used for setting the member 14 in open position, as seen in Fig. 4, a clasp 21 being secured on the top of the body 7 to receive and hold the handle 19 when the handle is swung forwardly and downwardly to raise the member 14 to open position.

The handle 19 is also used for swinging the member 14 into the body so as to constrain the animal in the crate or cell against movement therein, and means is provided for holding the member 14 when swung into the body. Such means includes a pawl or dog 22 hingedly or pivotally connected, as at 23, with the lower end portion of the member 14 to drag on the floor or bottom 8 in rear of said member 14. A plate 24 is secured on the floor or bottom 8 and has a longitudinal series of notches or slots 25 in which the dog 22 is engageable, to prevent the member 14 from swinging rearwardly accidentally. In order to conveniently raise the dog 22 for releasing the member 14, a chain 26 or other flexible member is connected to the dog 22, and its upper end engages a hook 27 carried by the member 14 near the upper end thereof.

In using the device, it is first set, as seen in Fig. 4, so as to receive the animal, the doors 10 being slightly opened and held by the chains 11, and the end member 14 being held in raised position by engaging the handle 19 with the clasp or holder 21. The animal can then be readily driven into the device from the rear end, and when the animal has entered the crate, the handle 19 is swung upwardly out of engagement from the clasp 21, thereby swinging the end member 14 downwardly to closed position. The handle 19 is swung rearwardly so as to force the member 14 into the body 7, thereby shoving the animal forwardly so that it is compelled to stick its nose out through the opening between the doors 10 over the head rest 13. The member 14 being swung forwardly and upwardly will raise the rear portion of the animal, as seen in Fig. 5, clamping it between said member 14 and the top of the body 7, and the animal is so wedged in the crate that it cannot move appreciably, thereby keeping the nose of the animal in protruding position, so that the nose ring can be quickly and conveniently applied. When the operation has been completed, the doors 10 are released, by disconnecting the chains 11 from the hooks 12, and the animal can then pass out forwardly over the shelf 9. The doors 10 are then reset, and by pulling on the chain 26, the dog 22 is disengaged from the plate 24, thereby permitting the member 14 to be swung rearwardly and upwardly. The device is thus quickly reset for the next operation.

Having thus described the invention, what is claimed as new is:—

1. A hog ringing crate comprising a body, means at one end of the body for accommodating the animal's nose, and a member suspended for swinging movement at the top of the body to swing from a depending position inwardly and upwardly within the body and to swing outwardly and upwardly from such depending position beyond the other end of the body.

2. A hog ringing crate comprising a body, means at one end of the body for accommodating the animal's nose, and an end member suspended for swinging movement at the top of the body to swing from a depending position inwardly and upwardly within the body.

3. A hog ringing crate comprising a body, means at one end of the body for accommodating the animal's nose, an end member suspended for swinging movement at the top of the body to swing from a depending position inwardly and upwardly within the body, and means for holding said member when swung into the body.

4. A hog ringing crate comprising a body, means at one end of the body for accommodating the animal's nose, an end member suspended for swinging movement at the other end of the body to swing inwardly and upwardly within the body, and a dog carried by said member and engageable over the bottom of the body for holding said member when swung into the body.

5. A hog ringing crate comprising a body, means at one end of the body for accommodating the animal's nose, an end member hingedly suspended at the top of the body to swing from a depending position inwardly and upwardly within the body, and an upwardly extending handle carried by said member to project above the top of the body for swinging said member into and away from the body.

6. A hog ringing crate comprising a body, means at one end of the body for accommodating the animal's nose, an end member hingedly suspended at the top of the body to swing from a depending position inwardly and upwardly within the body, an upwardly extending handle carried by said member to project above the top of the body for swinging said member into and away from the body, and means for holding said handle on the top of the body with said member swung upwardly to open position beyond the other end of the body.

7. A hog ringing crate comprising a body, means at one end of the crate for accommodating the animal's nose, an end member, means for suspending said member from the top portion of the body at different longitudinal positions for swinging movement, said member being arranged to swing from a depending position inwardly and upwardly within the body.

In testimony whereof I have signed my name to this specification in the presence of two subscribing witnesses.

FRANK L. OVERTON.

Witnesses:
WILLIAM H. GARTEN,
ROY B. MYERS.